July 28, 1959 ROSE BERTHE PAULINE SAINTESPRIT NEE MEUNIER 2,897,297

MAGNETIC AMPLIFIERS

Filed March 5, 1957

Inventor

Rose Berthe Pauline Saintesprit nee Meunier

By Karl W. Flocks

Attorney

United States Patent Office 2,897,297
Patented July 28, 1959

2,897,297

MAGNETIC AMPLIFIERS

Rose Berthe Pauline Saintesprit, née Meunier, Chaville, France, assignor to Lignes Telegraphiques et Telephoniques, Paris, France, a joint-stock company of France Application March 5, 1957, Serial No. 644,107

Claims priority, application France May 29, 1956

4 Claims. (Cl. 179—171)

The present invention relates to the reduction of the distortion in signals in magnetic amplifiers. It is known that these apparatus always have a responding time which may be troublesome and which can cause a distortion of the signals transmitted by the amplifier. In particular, in a case where the feed of the amplifier is effected by a sinusoidal alternating potential and where the "times" of the control signal of the amplifier, i.e., its beginning and its end, do not coincide with the passages to zero of this feed voltage, which is most frequently the case, the alternation which follows the end of the signal is truncated, thus causing a distortion. To prevent this from being a hindrance, a short period of feed voltage is usually selected in relation to the duration of the signal, but it is not always possible to select this period, and the distortion of the signal may then be prohibitive.

One object of the present invention is to obviate these disadvantages by the use of the known phenomenon whereby when the duration of the control signal of a magnetic amplifier is equal to that of a whole number of complete alternations of the feed voltage of said amplifier, the said control signal is not subjected to any distortion in the apparatus and the outgoing signal has the same duration as the control signal, but is delayed by one alternation.

Another object of the invention is to provide a method for converting the incoming signal into another signal having a duration as near as possible to that of said incoming signal and whose duration is equal to that of a whole number of complete alternations of the feed voltage of the magnetic amplifier and to use this second signal for controlling the magnetic amplifier itself, thanks to which the complete alternations of the feed voltage are magnetically amplified without distortion.

Another object of the invention is to apply the aforementioned method to a chain of magnetic amplifiers.

The invention shall now be described in more detail by means of a form of embodiment in reference to the accompanying drawing, in which.

Figures 1, 2:
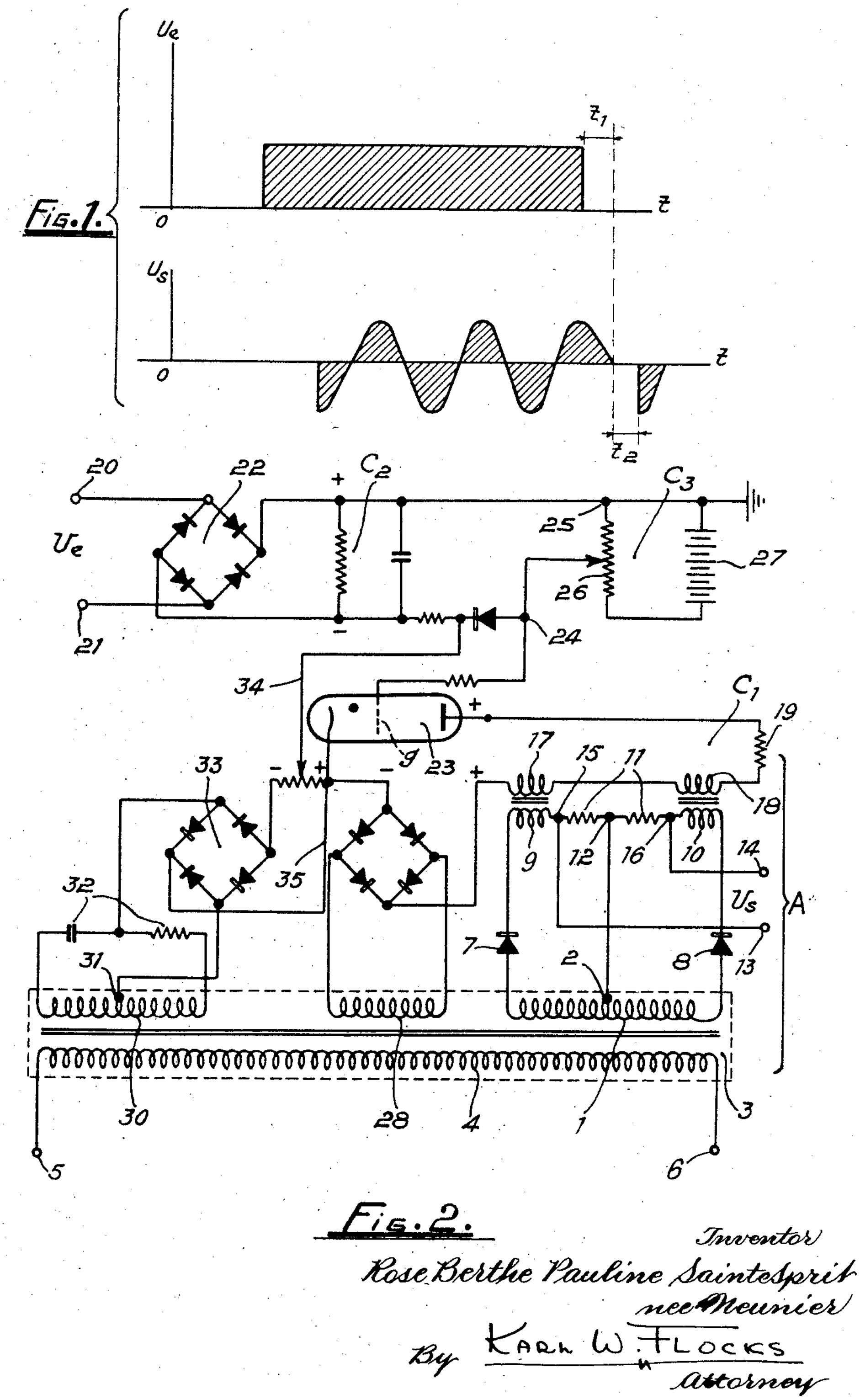
Figure 1 shows the distortion of a signal in a magnetic amplifier not using the method according to the invention.
Figure 2 shows an example of a device enabling the method according to the invention, to be carried out.

Figure 1 is used to explain the distortion of the signal, mentioned above, in a magnetic amplifier which does not make use of the method according to the invention; the upper part of this figure shows, in function of the time $t$, the continuous or rectified voltage $U_e$ of a control signal of a magnetic amplifier. It is presumed, what is most frequently the case, that the "times" of this signal do not coincide with the passages to zero of the sinusoidal feed voltage. At the bottom part of Figure 1 the voltage $U_s$ of the output signal is shown; the control signal ceases at a time $t_1$ before the end of the corresponding alternation; the saturation time $t_2$ of the magnetic amplifier, or time required for saturating the corresponding core, which is proportional to $t_1$, retards the end of the output signal and causes a distortion.

Figure 2 shows, diagrammatically and merely by way of example, a possible form of embodiment of a magnetic amplifier according to the invention, i.e., a magnetic amplifier comprising a device which converts the incoming signal into a signal of a duration which is practically the same but equal to the duration of a whole number of complete alternations of the feed voltage, and which utilizes the thus converted signal for controlling the magnetic amplifier itself, so that the complete alternations of the feed voltage are magnetically amplified without distortion.

In this Figure 2, the magnetic amplifier itself A comprises: a winding 1 having a central tapping 2, which supplies the feed voltage, this winding being a secondary of a transformer 3 whose primary 4 is connected to the terminals 5, 6 of a source of alternating current. The feed voltage supplied by the winding 1, is applied, by means of two rectifiers 7, 8 to two operative or primary windings 9, 10 connected to each other by a load resistance 11 with central tapping 12, this latter being connected to the central tapping 2 of the winding 1. The output terminals 13, 14 of the amplifier where the voltage $U_s$ of the outgoing signal can be collected, are respectively connected at 15 and 16 between the operative windings 9 and 10 and the load resistance 11. The operative windings 9 and 10, according to their magnetic state, enable each of the alternations of the feed voltage either to be supplied to the central lead resistance 11, with central tapping or to be blocked, through the rectifiers 7 and 8.

Two secondary windings 17 and 18 for controlling two coils 9, 10 of the magnetic amplifier are mounted in series in a circuit $C_1$ comprising a resistance 19 having a sufficiently high value to render negligible the time constant of the control circuit of the amplifier itself.

Normally, the incoming signal would be applied at the terminals of the circuit $C_1$, resulting in a generally prohibitive distortion of said signal.

According to the invention, the voltage $U_e$ of the incoming signal is applied at input terminals 20, 21 connected to the diagonal of a rectifying bridge 22 the other diagonal of which is connected to a circuit $C_2$ effecting a filtering of the rectified signal at 22, without introducing a troublesome time constant.

The signal thus rectified and filtered is applied to the grid of a gas-filled tube 23, for example a cold cathode lamp or a thyratron.

The terminals 24 and 25 of the circuit $C_2$ are connected by means of a potentiometer 26, to a circuit $C_3$ comprising a battery 27. As a result of this arrangement the signal is clipped by the battery 27 whereas the tube 23 is blocked by said battery 27, in the absence of a signal.

The anode voltage of the tube 23 is supplied from the source at the terminals 5, 6 of the primary winding 4 of the transformer 3, by means of a winding 28 which forms a secondary of said transformer 3 and whose voltage at the terminals is applied to the diagonal of a rectifying bridge 29. The voltage at the terminals of the winding 28, thus rectified, is applied to the anode of the tube 23, through the circuit $C_1$.

As has already been seen, the tube 23 is blocked by the battery 27, in the absence of a signal; when a signal reaches the terminals 20, 21, it applies a positive voltage to the grid of the tube 23 and the latter becomes conductive, only to become blocked at the end of one alternation of the anode voltage, with the result that, at the end of a signal, a complete alternation is always provided at the output of the magnetic amplifier.

Under these conditions, according to the invention, in order to obtain a whole number of alternations, it is necessary that the tube should become conductive only at the beginning of an alternation of the anode voltage.

This condition is achieved, for example, by adding to the voltages of the control grid *g* of the tube 23, a negative voltage obtained from the feed voltage coming from the feed source connected to the terminals 5 and 6, the said negative voltage applied to the grid *g* being slightly out of phase in relation to the feed voltage in order that it may pass through zero substantially when the tube 23 becomes conductive, and after a very short time, that it may be sufficient to prevent the tube from becoming conductive until its next passage through zero.

This is advantageously carried out by means of a winding 30 with central tapping 31, forming a secondary of the transformer 3, whose voltage is slightly out of phase by means of a phase shifter 32 and applied to a diagonal of a rectifying bridge 33 whose terminals of the other diagonal are respectively connected to the grid *g* and to the cathode of the tube 23 by the leads 34 and 35.

As a result of the arrangement which has just been described, there is obtained, in the anode circuit of the tube 23, a train of complete rectified alternations which are utilised for controlling the magnetic amplifier.

For a given incoming signal, the corrected signal comprises as many rectified alternations as there are passages through zero of the feed voltage during the period of said given signal.

The invention, in addition to the advantages already referred to, affords the following ones:

If, at the output of the magnetic amplifier, the signal is applied to the input of a transmission circuit, the method according to the invention enables the distortion of the last alternation to be avoided, which otherwise would occur.

If the magnetic amplifier to which the method according to the invention is applied, is followed by other magnetic amplifiers mounted in series with it, the signal corrected in the first amplifier, possibly with a distortion that remains less than a half-period of the feed voltage, is amplified without distortion in the following magnetic amplifiers, even if its beginning does not coincide with a passage through zero of the feed voltage in one of these amplifiers, provided that the frequency of the feed voltage of the various magnetic amplifiers is the same.

What I claim is:

1. A device for reducing the distortion of signals in a chain of magnetic amplifiers comprising: a magnetic amplifier adapted to have a signal voltage applied thereto and comprising primary and secondary windings, means comprising means for rectifying an input voltage and applying said input voltage as rectified to said primary winding, and a control circuit connected to said secondary winding and comprising a gas filled tube having an anode, a grid and a cathode, means comprising a winding to supply an alternating voltage of the same frequency as the amplifier input voltage, to rectify said alternating voltage and to apply said voltage as thus rectified to said anode, a signal voltage circuit comprising a rectifier, a filter and clipping means for said signal voltage comprising a battery connected to the grid of said tube, said signal voltage circuit blocking said tube in the absence of an incoming signal, and a circuit comprising a winding effecting an alternating voltage of the same frequency as the input voltage of the magnetic amplifier, a phase shifter and a rectifier connected to the grid of the tube to apply a blocking voltage thereto said tube becoming conductive when the blocking voltage passes through zero while a signal voltage from said signal voltage circuit is applied to said grid, whereby the voltage signal is converted into a signal comprising as many rectified alternations as there are passages through zero of the feed voltage, throughout the duration of the incoming signal.

2. A device for reducing the distortion of signals in a chain of magnetic amplifiers comprising: a magnetic amplifier adapted to have a signal voltage applied thereto and comprising primary and secondary windings, said primary winding adapted to have an input voltage applied thereto, and a control circuit connected to said secondary winding and comprising a gas filled tube having an anode, a grid and a cathode, means to supply an alternating voltage of the same frequency as the amplifier input voltage, to rectify said alternating voltage and to apply said voltage as thus rectified to said anode, signal voltage circuit means to receive a signal voltage, and rectify, filter and apply said signal voltage as thus rectified and filtered to the grid of said tube, means to supply an alternating voltage of the same frequency as said amplifier input voltage, to shift the phase of and to rectify said alternating voltage and to apply said voltage as thus phase shifted and rectified as a blocking voltage to the grid of said tube said tube becoming conductive when the blocking voltage passes through zero while a signal voltage from said signal voltage circuit means is applied to said grid, whereby the incoming signal is converted into a signal comprising as many rectified alternations as there are passages through zero of the magnetic amplifier input voltage throughout the duration of said signal voltage.

3. A device according to claim 2, in which the signal voltage circuit means comprises a battery which clips off said signal voltage and blocks the tube in the absence of this same signal.

4. A device according to claim 2, in which the input voltage of the amplifier itself, the anode voltage of the gas-filled tube and the blocking voltage of the tube are supplied by respective windings forming the secondaries of a single primary transformer connected to the terminals of the input voltage means.

References Cited in the file of this patent

UNITED STATES PATENTS

| | | |
|---|---|---|
| 2,458,937 | Glass | Jan. 11, 1939 |
| 2,740,086 | Evans et al. | Mar. 27, 1956 |
| 2,773,131 | Sakamoto | Dec. 4, 1956 |
| 2,783,315 | Ramey | Feb. 26, 1957 |

OTHER REFERENCES

"Electronics," August 1953, pages 136–140, "Transistor-Controlled Magnetic Amplifier," by Richard H. Spencer.